United States Patent [19]

Greuel, Jr. et al.

[11] Patent Number: 5,660,660
[45] Date of Patent: Aug. 26, 1997

[54] HEAT-RECOVERABLE ARTICLE

[75] Inventors: Walter J. Greuel, Jr., Bonita; George Pieslak, Atherton, both of Calif.; Efrain Renteria, Tijuana, Mexico; Stanley Simpson, Montgomery, Tex.; Jan L. Vansant, Leuven, Belgium; Barnie A. Wallace, Jr., Bonita, Calif.

[73] Assignee: Raychem Corporation, Menlo Park, Calif.

[21] Appl. No.: 290,972

[22] Filed: Oct. 25, 1994

Related U.S. Application Data

[63] Continuation-in-part of Ser. No. 156,518, Nov. 23, 1993, filed as PCT/US93/01592, Feb. 24, 1993, abandoned, which is a continuation of Ser. No. 841,391, Feb. 25, 1992, abandoned.

[51] Int. Cl.⁶ ..................................... B32B 31/26
[52] U.S. Cl. .............. 156/85; 156/86; 156/244.11; 156/244.13; 156/244.24; 156/244.26; 156/64; 264/342 R; 174/DIG. 8; 428/34.9; 428/35.1; 428/156; 428/347; 138/99
[58] Field of Search ............... 428/34.9, 156, 428/167, 346, 343, 35.1, 347; 174/DIG. 8; 156/86, 155, 84, 85, 209, 244.11, 244.13, 244.24, 244.26, 64, 378; 138/97, 98, 99; 264/342 R

[56] References Cited

U.S. PATENT DOCUMENTS

| | | | |
|---|---|---|---|
| 2,027,962 | 1/1936 | Currie | 18/55 |
| 3,086,242 | 4/1963 | Cook et al. | 18/1 |
| 3,597,372 | 8/1971 | Cook | 260/4 |
| 3,607,496 | 9/1971 | Kissell | 156/86 |
| 3,957,382 | 5/1976 | Greuel, Jr. et al. | 403/27 |
| 4,181,775 | 1/1980 | Corke | 428/348 |
| 4,200,676 | 4/1980 | Caponigro et al. | 428/57 |
| 4,207,364 | 6/1980 | Nyberg | 428/36 |
| 4,374,881 | 2/1983 | Hamilton | 428/36 |
| 4,386,984 | 6/1983 | Jervis | 156/86 |
| 4,428,790 | 1/1984 | Diaz | 156/86 |
| 4,450,871 | 5/1984 | Sato et al. | 138/140 |
| 4,586,971 | 5/1986 | Wallace, Jr. | 156/85 |
| 4,650,703 | 3/1987 | Kleinheins | 428/36 |
| 4,661,314 | 4/1987 | Levine et al. | 264/508 |
| 4,705,657 | 11/1987 | Poulin | 264/22 |
| 4,803,103 | 2/1989 | Pithouse et al. | 428/34.5 |
| 4,803,104 | 2/1989 | Peigneur et al. | 428/35.1 |
| 4,879,430 | 11/1989 | Hoffman | 428/35.1 |
| 5,165,982 | 11/1992 | Gübitz et al. | 428/141 |

FOREIGN PATENT DOCUMENTS

| | | | |
|---|---|---|---|
| 601021 | 6/1978 | Switzerland | B32B 31/26 |
| 2056192 | 7/1979 | United Kingdom | H02G 15/00 |

*Primary Examiner*—Rena Dye
*Attorney, Agent, or Firm*—Marguerite E. Gerstner; Timothy H. P. Richardson; Herbert G. Burkard

[57] ABSTRACT

An article (2) in which at least part of a surface (8) of a polymeric element has an embossed pattern (6). The article may be either heat-recoverable or non-heat-recoverable. If the article is heat-recoverable, when heated the article recovers and the embossed surface becomes substantially smooth. The change in surface texture can be used to indicate that sufficient heat has been applied to the article to achieve adequate recovery and/or to adequately melt an attached adhesive layer (10). In another embodiment, the article (2) is in the form of a patch (14) which can be used to secure the opposing longitudinal edges of heat-recoverable article which is in the form of a wraparound sheet.

4 Claims, 3 Drawing Sheets

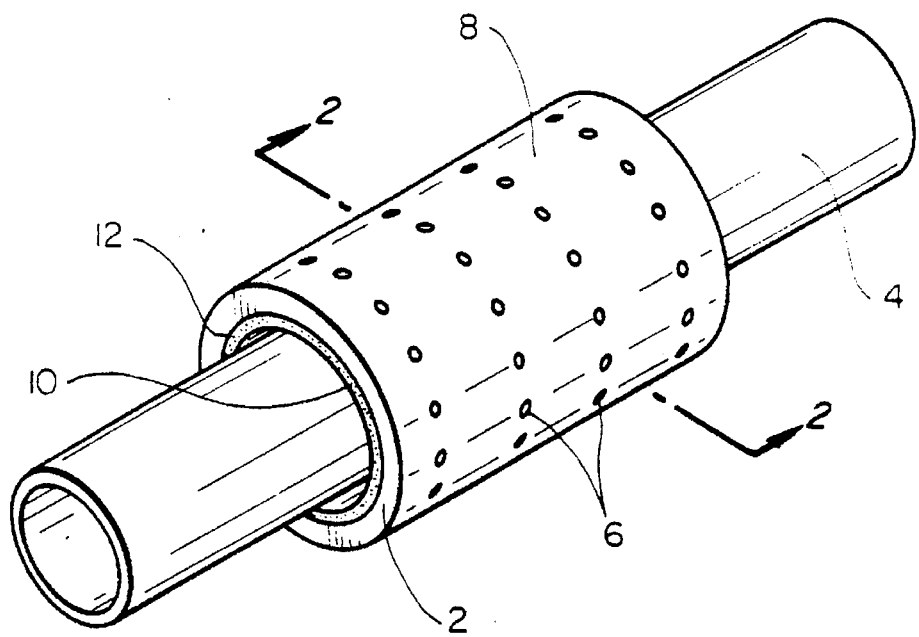
FIG_1
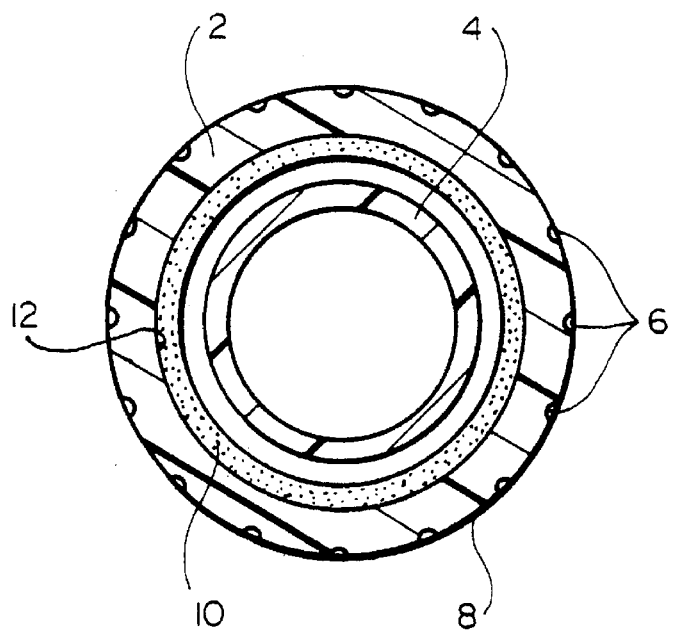
FIG_2

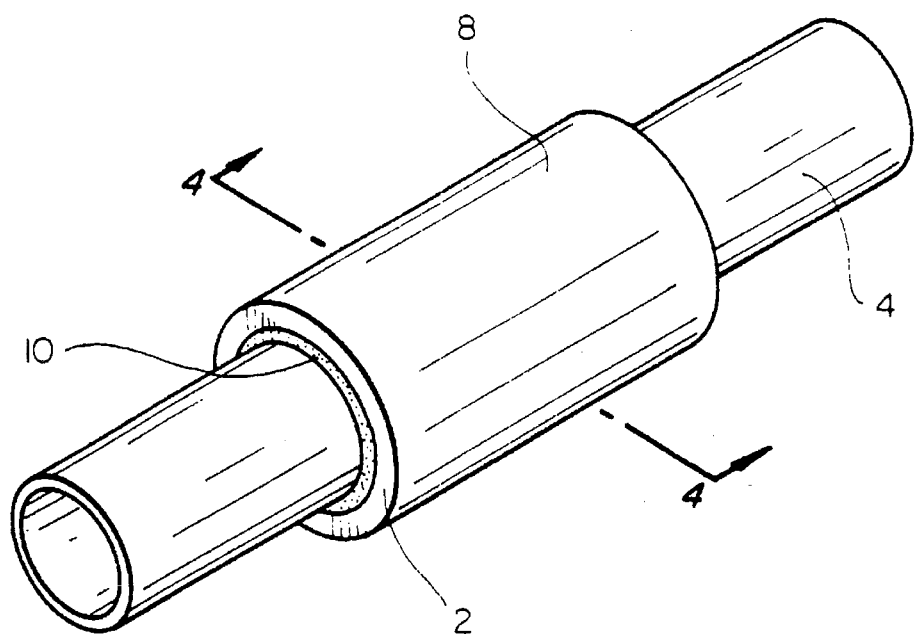
FIG_3
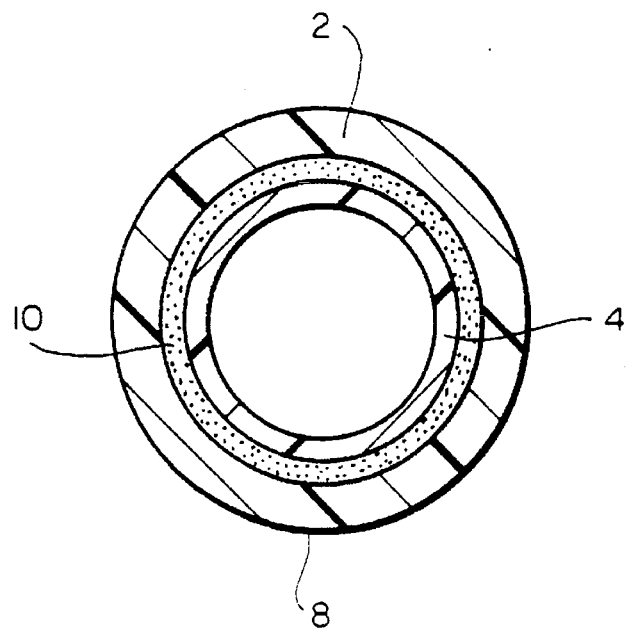
FIG_4

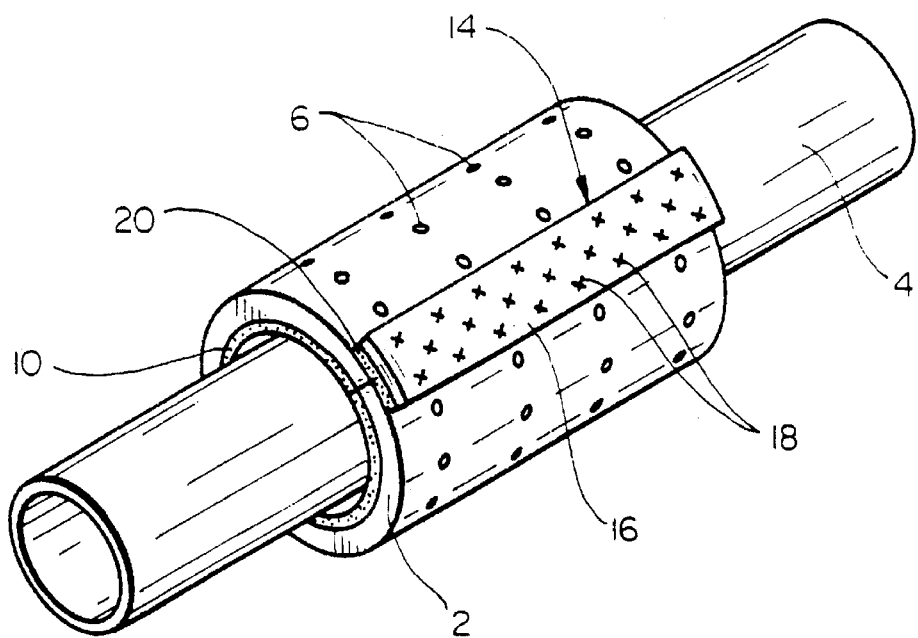
FIG_5
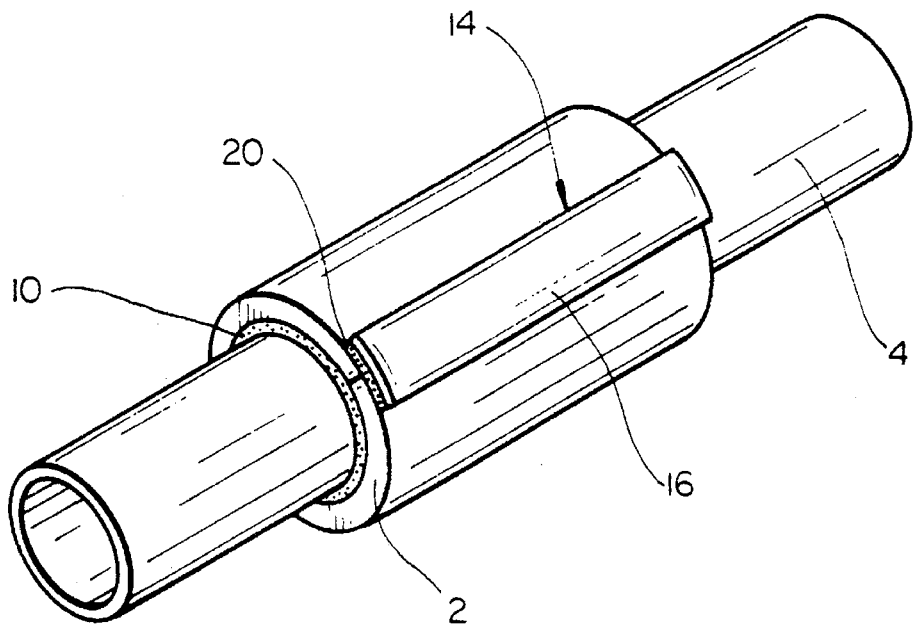
FIG_6

HEAT-RECOVERABLE ARTICLE

CROSS-REFERENCE TO RELATED APPLICATIONS

This application is a continuation-in-part application of commonly assigned International Application No. PCT/US93/10592 (Raychem Corporation), filed Feb. 24, 1993, and a continuation of application Ser. No. 08/156,518 (Gruel, Jr. et al), filed Nov. 23, 1993, now abandoned, which is a continuation of application Ser. No. 07/841,391, filed Feb. 25, 1992, now abandoned, the disclosures of which are incorporated herein by reference.

BACKGROUND OF THE INVENTION

1. Field of the Invention

This invention relates to dimensionally recoverable articles, particularly heat-recoverable articles, and to a method of installing such articles.

2. Introduction to the Invention

A dimensionally recoverable article is an article the dimensional configuration of which may be made substantially to change when subjected to treatment. Usually these articles recover towards an original shape from which they have previously been deformed, but the term "recoverable" as used herein, also includes an article which adopts a new configuration even if it has not been previously deformed.

A typical form of a dimensionally recoverable article is a heat-recoverable article, the dimensional configuration of which may be changed by subjecting the article to heat treatment. In their most common form, such articles comprise a heat-shrinkable sleeve made from a polymeric material exhibiting the property of elastic or plastic memory as described, for example, in U.S. Pat. Nos. 2,027,962 (Currie); 3,086,242 (Cook et al); and 3,597,372 (Cook), the disclosures of which are incorporated herein by reference. The polymeric material has been crosslinked during the production process so as to enhance the desired dimensional recovery. One method of producing a heat-recoverable article comprises shaping the polymeric material into the desired heat-stable form, subsequently crosslinking the polymeric material, heating the article to a temperature above the crystalline melting point (or, for amorphous materials the softening point of the polymer), deforming the article, and cooling the article while in the deformed state so that the deformed state of the article is retained. In use, because the deformed state of the article is heat-unstable, application of heat will cause the article to assume its original heat-stable shape.

Recoverable articles are commonly used to cover objects, such as pipes or cables, having a tubular elongate configuration to provide, for example, environmental sealing protection. Where the diameter of the pipe is very large, thus making extrusion of a sufficiently large tubular sleeve difficult, or where no free end of the elongate object is available, it is common to use a wrap-around article, i.e. an article, typically in the form of a sheet, that is installed by wrapping it around the object to be covered so that opposed longitudinal edges overlap. A closure means is applied to secure together the opposed longitudinal edges of the wraparound article. Such articles are described in U.S. Pat. Nos. 4,200,676 (Caponigro et al), 4,586,971 (Wallace), and 4,803,104 (Peigneur et al), the disclosures of which are incorporated herein by reference.

Recovery of the article is generally achieved by heat, e.g. from a torch, resistance wires, or other source. Such recovery can be craft-sensitive because it is necessary to heat the article sufficiently to recover it into contact with the substrate, but not so much that the article itself is damaged. In addition, if some or all of the surface of the article adjacent to the substrate is covered with an adhesive layer, it is necessary to heat the article enough to ensure that the adhesive layer is adequately heated and, for some adhesives, can flow. This can be difficult because the adhesive layer is usually covered by the article and thus is not visible for inspection. One common solution to this problem has been the use of a thermochromic paint on the outside of the heat-recoverable article. The paint is selected based on the nature of the article and the adhesive, if any, so that the paint changes color when adequate heat has been supplied. While such paint does allow the article to be inspected after recovery, the paint itself is expensive, must be applied using a solvent, and may produce "chalking" which is undesirable.

In another approach, described in U.S. Pat. No. 3,957,382 (Greuel, Jr. et al), the disclosure of which is incorporated herein by reference, a fusible insert which has protuberances on one surface is positioned between the substrate and the heat-recoverable sleeve. The protuberances are designed to prevent the sleeve from slipping out of position during installation. If the protuberance has a melting temperature similar to that of the insert, small bumps will be visible on the surface of the sleeve after recovery, indicating that the insert has been inadequately heated. This approach requires that a fusible insert be used and is not necessarily appropriate for use in systems without an insert.

SUMMARY OF THE INVENTION

We have now discovered that an article which is either heat-recoverable or non-heat-recoverable can be made with a simple and effective inspectability feature if the outer surface of the article is embossed with a pattern which "disappears" when adequate heat is applied. Such a feature allows the craftsman to quickly determine which sections, if any, of an article have not been sufficiently heated and/or recovered. In a first aspect, this invention provides an article comprising a polymeric element, said element comprising:

(1) a first surface which has an embossed pattern over at least part of the surface; and (2) a second surface.

In a second aspect, this invention provides a method of indicating adequate recovery of a heat-recoverable article when the article of the first aspect is heat-recoverable, said method comprising (1) providing a heat-recoverable article of the first aspect;

(2) positioning the second surface adjacent to a substrate; and (3) applying sufficient heat to the article to cause the article to recover and to cause the first surface comprising the embossed pattern to become substantially smooth.

In a third aspect, this invention provides an assembly which comprises an article of the first aspect of the invention.

BRIEF DESCRIPTION OF THE DRAWINGS

The invention is illustrated in the drawing in which

FIG. 1 shows a perspective view of a heat-recoverable article of the invention positioned on a substrate prior to recovery;

FIG. 2 shows a cross-sectional view of the article of the invention along line 2—2 of FIG. 1;

FIG. 3 shows a perspective view of a heat-recoverable article of the invention positioned on a substrate following recovery of the article;

FIG. 4 shows a cross-sectional view of the article of the invention along line 4—4 of FIG. 3; and FIGS. 5 and 6 show a perspective view of articles of the invention comprising a path of the invention, prior to and after recovery, respectively.

DETAILED DESCRIPTION OF THE INVENTION

The article of this invention generally is heat-recoverable, i.e. the dimensional configuration of the article can be substantially changed when the article is subjected to heat treatment. When heated, these articles generally recover towards an original shape from which they have previously been deformed, but the term "heat-recoverable" as used in this specification, also includes an article which, on heating, adopts a new configuration, even if it has not been previously deformed.

The article may be of any convenient shape, e.g. a hollow tube or sleeve or a sheet. The shape is generally dependent on the shape of the substrate and is selected to allow easy installation onto the substrate. For many applications, the substrate has an elongate tubular configuration, such as is found with pipes or cables. Either a heat-recoverable sleeve or a wraparound sheet may be appropriate for covering such a substrate. When the pipe has a relatively large diameter, e.g. 8 inches (0.20 m) or larger, it is preferred that a wraparound sheet be used. Even if the diameter is relatively small, e.g. 2 to 6 inches (0.05 to 0.15 m), a wraparound sheet may be preferred if access to the pipe end is difficult. When the article is designed for use as a patch or closure for joining overlapping edges of a heat-recoverable wraparound sheet, the article may be in the form of a laminar strip. Such a patch may be either heat-recoverable or non-heat-recoverable.

The article comprises a polymeric element which has a first surface and a second surface. The polymeric element may be composed of any suitable polymer, e.g. polyolefins such as high density polyethylene, low density polyethylene, and polyethylene copolymers such as ethylene/ethyl acrylate copolymer, ethylene/acrylic acid copolymer, or ethylene/vinyl acid copolymer; fluoropolymers such as polyvinylidene fluoride or ethylene/tetrafluoroethylene copolymer; nylon; or elastomers. The polymeric element is normally extruded or otherwise melt-shaped. The thickness of the element is dependent on the size of the substrate and the strength required by the article in its recovered state. Generally, the polymeric element has an unexpanded thickness of 0.5 to 0.2 mm (0.020 to 0.080 inch), although thicker or thinner elements may be useful for different applications. Following extrusion (or in the case of chemical crosslinking, during extrusion), the polymeric element is crosslinked by radiation or chemical means. The element is then expanded or otherwise deformed from its original extruded shape. In most applications, the expansion is conducted at a temperature above the melting point of the polymer. It may be unidirectional or multidirectional, depending on the final product. Expansion of polymeric sheet is often conducted by heating the sheet, passing it over heated rollers, and stretching it. The stretched sheet is then cooled by passing it around cold rollers. Generally, the expanded sheet has a thickness of from 50% to 85% of the thickness of the unexpanded sheet. Thus a sheet with an unexpanded thickness of 0.5 mm (0.020 inch) might have an expanded thickness of 0.43 mm (0.017 inch), while a sheet with an unexpanded thickness of 2 mm (0.080 inch) might have an expanded thickness of 1 mm (0.040 inch).

At least part of the first surface of the polymeric element has an embossed pattern which is visible to the craftsman during installation of the article. Thus the first surface generally comprises the outer surface of the article as it is installed. Alternatively, it may be covered with a transparent environmental protection layer through which the pattern may be observed during installation. The embossed pattern may be applied by any means, for example by stamping or by a hot press. For some applications, the embossed pattern is applied during the expansion process. For instance, if the polymeric element is in the form of a sheet, the heated sheet passes from a hot roller during expansion to a cold roller which has the embossed pattern imprinted on it. Because the polymeric element is still warm, the pattern becomes impressed onto the polymeric element, and as the element cools, the pattern freezes into place. Because the expanded form of the polymeric element is heat-unstable, application of sufficient heat to return the polymeric element to a temperature above the deformation temperature will cause the polymeric element to assume its original heat-stable configuration. The embossed pattern will thus "disappear" and the first surface will become substantially smooth. In this specification, a first surface is considered smooth if the embossed pattern, following heating and recovery of the article, has a depth, when measured from the first surface, that is at most 0.25 times the original depth of the pattern. For most applications, the depth of the embossed pattern following recovery of the article is preferably at most 0.20 times the original depth, particularly at most 0.10 times the original depth.

The embossed pattern may be composed of an abstract design or a random pattern. Alternatively, the pattern may be a regular arrangement. For example, instructions such as "Keep Heating" may be embossed into the surface. When adequate heat has been applied, the instructions will no longer be visible. Depending on the application, the embossed pattern may cover only part of the first surface of the polymeric element or it may cover substantially the entire first surface. In general, the embossed pattern covers at least 10%, preferably at least 20%, particularly at least 30% of the area of the first surface. Isolated and random cosmetic flaws, occurring as a result of the preparation of the article, are not considered an embossed pattern for purposes of this specification.

The depth of the embossed pattern is a function of the type of polymer, the thickness of the element, the required expansion, the extent of recovery desired in the article, and other factors such as the type and melting temperature of any adhesive which may be present. In general, the depth of the embossed pattern is at least 0.050 mm (0.002 inch), preferably at least 0.075 mm (0.003 inch), particularly at least 0.100 mm (0.004 inch), e.g. 0.125 to 0.200 mm (0.005 to 0.008 inch). For a polymeric element which a thickness in the expanded state of 0.75 to 1.0 mm (0.030 to 0.040 inch), the embossed pattern may have a depth of 0.2 mm (0.008 inch) inch. The pattern may easily be applied to the first surface of the warm polymer by use of a nip or roller which has a relatively hard surface. For some applications, a hardened silicone rubber is used as the embossing material. The pressure of the roller or nip can readily be adjusted by means of pneumatic cylinders. In order to avoid damage to the polymeric element, it is preferred that the temperature during the embossing pattern be 5° to 25° C. above the melting temperature of the polymer, particularly 5° to 15° C. above the melting temperature of the polymer, especially 5° to 10° C. above the melting temperature of the polymer, the melting temperature being defined as the peak of the curve on a differential scanning calorimeter. Temperature of the roller, speed of the process, and pressure during the embossing can all be readily adjusted to accommodate different polymers or patterns.

The second surface of the polymeric element is positioned adjacent the substrate. Generally part or all of the second surface is coated with a layer of adhesive or mastic. The adhesive melts and may flow during installation of the article, filling gaps between the substrate and the article, and ensuring a good seal between the substrate and the article. The adhesive is selected depending on the nature of the article and the substrate. When the substrate comprises a polymeric pipe, hot melt adhesives are preferred. Such adhesives, which are described, for example, in U.S. Pat. Nos. 4,181,775 (Corke) and 4,586,971 (Wallace), may be lightly crosslinked (e.g. have a gel content of greater than about 5%), and have a tack temperature which is less than the recovery temperature of the article.

In addition to the polymeric element, the heat-recoverable article may comprise a reinforcing layer, e.g. woven fabric, or other layers.

In addition to heat-recoverable articles, the invention also comprises articles which are not heat-recoverable (i.e. are dimensionally stable) but which comprise a polymeric element which comprises an embossed pattern over at least part of a first surface. Such heat-stable articles are particularly useful as patches or closure devices for joining the overlapping edges of a heat-recoverable article of the invention such as a wraparound sleeve, although the patch can also be used to repair a fully-recovered article or to make a connection directly to a non-heat-recoverable substrate. When the patch is used as part of an assembly in conjunction with an heat-recoverable article which has an embossed surface, e.g. to cover a pipe or other substrate, all parts of the assembly can be readily inspected to determine whether adequate heat has been applied. Conventional patch closures are described in U.S. Pat. Nos. 4,200,676 (Caponigro et al), 4,586,971 (Wallace), and 4,803,104 (Peigneur et al), the disclosures of which are incorporated herein by reference. For some applications, e.g. in situations where it is desirable that stress in the patch be minimized during installation, it is preferred that the patch itself be heat-recoverable.

The patch comprises a polymeric element which, depending on the application, comprises one or more polymer layers. The first polymeric surface of the polymer element has an embossed pattern over at least of the surface. It is this surface which serves to provide an indication that the patch has been heated sufficiently to heat any attached adhesive layer and/or to make good contact to the heat-recoverable article or other substrate to which the patch is attached. The patch generally comprises an adhesive layer of adhesive or mastic which may be physically attached to the second surface of the polymeric element of the patch or may be in the form of a free-standing film or sheet which is inserted between the second surface and the substrate. When the polymeric element comprises two or more polymer layers, the layer which is positioned adjacent to the substrate generally is an adhesive layer. In order to provide strength, the polymeric element of the patch may be crosslinked, e.g. by irradiation or chemical means. The level of crosslinking is determined by measuring the modulus at 100% elongation ($M_{100}$) at 150° C. according to ATSM D-638. The patch may comprise a reinforcing layer in addition to or as part of the polymeric element. Any appropriate polymer may be used to form the patch, e.g. polyethylene, polypropylene, or nylon. The polymer may contain additives such as antioxidants, pigments, ultraviolet stabilizers, crosslinking agents, process aids, and similar materials. Additives such as carbon black serve to improve the environmental resistance, stability to ultraviolet radiation, and thermal stability when exposed to heat during installation.

In a preferred embodiment, the polymeric element of the patch comprises two polymer layers. The two layers may be made from the same or different polymers. The first layer comprises the outer or backing layer of the patch and is selected to have good environmental resistance and stability. The first surface of the first layer is at least partly embossed with a pattern. The second layer acts as the adhesive layer and bonds to the substrate. Although the patch may comprise other layers, generally the second surface of the first layer is in contact with and bonded to the first surface of the second layer. Both layers may be crosslinked. The level of crosslinking in each layer depends on the type of polymer, the thickness of the patch, and the desired properties of each layer. If both layers comprise the same polymer, it is preferred that the crosslinking level in the first layer be greater than that in the second layer. The crosslinking level in the second layer should be high enough to allow the layer to resist the high recovery forces of the wraparound sleeve which may be the substrate, but low enough to maintain good adhesion to the substrate. If the crosslinking level in the second layer is too high, the ability of the polymer to bond to the substrate will be reduced. Because different polymers respond differently to a given irradiation dose, if the first and second layers comprise different polymers, the resulting crosslinking level in them may be different even if the same irradiation does is given to both.

The invention is illustrated by the drawing in which FIG. 1 shows a heat-recoverable article 2 of the invention in the form of a tube positioned on substrate 4 which is a pipe. An embossed pattern 6, positioned on the first surface 8 of the polymeric element comprising the article, is visible prior to recovery of the article. Also shown is an adhesive layer 10 which is applied to the second surface 12 of the polymeric element. The cross-sectional view along line 2—2 of FIG. 1 of the heat-recoverable article prior to recovery is shown in FIG. 2.

FIG. 3, and the cross-sectional view along line 4—4 shown in FIG. 4, illustrate the recovered article 2 positioned on the substrate 4. The article 2 is tightly attached to the substrate 4 by means of the adhesive layer 10, and the embossed pattern 6 is no longer visible.

FIG. 5 shows a heat-recoverable article 2 of the invention which is in the form of a wraparound sheet which is positioned on pipe substrate 4. An embossed pattern 6 is visible on the first surface of the polymeric element prior to recovery. Adhesive layer 10 is applied to the second surface 12 of the polymeric element. The opposing longitudinal edges of article 2 are covered by patch closure member 14 which comprises a first polymeric layer 16 which has an embossed pattern 18 on the first surface, and a second polymer layer 20 which is an adhesive layer and is attached to the second surface of the first layer. FIG. 6 shows the assembly following recovery of article 2 and heating of the patch to an extent sufficient to melt the adhesive of second layer 20 and bond to article 2. The embossed patterns on both article 2 and patch 14 are no longer visible following heating and recovery.

The invention is illustrated by the following example.

EXAMPLE

A polymeric element was prepared by compounding a mixture of high density polyethylene, ethylene/methyl acrylate copolymer, ethylene-propylene diene rubber (EPDM), carbon black, and antioxidants, and then extruding the mixture to produce a sheet with a thickness of about 1.0 mm (0.040 inch). The polymeric element was irradiated to achieve a crosslinking level which produced a modulus ($M_{100}$) at 150° C. of 40 psi, then expanded 28%, and cooled. During the expansion and cooling processes, an embossed pattern was impressed onto the first surface of the polymeric element. A layer of polyethylene-based hot-melt adhesive was then coated onto the second surface of the polymeric element to complete preparation of the heat-recoverable article in the form of a wraparound sheet.

A patch was prepared by extruding the above mixture to produce a sheet with a thickness of 0.64 mm (0.025 inch). The sheet was irradiated to achieve a crosslinking level which produced a modulus ($M_{100}$) at 150° C. of 60 psi, and was then embossed on a first surface. The second surface of the sheet was coated with a layer of polyethylene-based hot-melt adhesive approximately 0.38 mm (0.015 inch) thick. The coated sheet was irradiated 5 Mrads to improve the high temperature strength of the adhesion layer. The irradiated sheet was then slit into laminar strips, each of which formed a patch.

To install the heat-recoverable article onto a pipe substrate, the pipe was preheated. The wraparound sheet was wrapped around the pipe and the patch was positioned at the overlapping edges of the article. Using a torch, the patch was heated until the embossed pattern disappeared, i.e. it became substantially smooth, indicating that the hot-melt adhesive had melted. The wraparound sheet was then heated until the embossed pattern disappeared, indicating that the sheet had fully recovered and that the hot-melt adhesive had melted and bonded to the pipe substrate.

What is claimed is:

1. A method of indicating adequate recovery of a heat-recoverable article, said method comprising
   (1) providing a heat-recoverable article which comprises a polymeric element, said polymeric element having been prepared by
      (i) extruding the polymeric element in the form of a continuous sheet, sleeve, or tube,
      (ii) expanding the extruded element, and
      (iii) embossing a first polymeric surface of the element while expanding the element, said element comprising
         (a) the first polymeric surface having an embossed pattern over at least part of the first surface, and
         (b) a second polymeric surface which is not embossed;
   (2) positioning the second surface of the element adjacent to a substrate; and
   (3) applying sufficient heat to the article to cause the article to recover into contact with the substrate and to cause the first surface of the element which comprises the embossed pattern to become substantially smooth.

2. A method according to claim 1 wherein (i) the article further includes an adhesive layer which is positioned adjacent to the second surface, and (ii) the applied heat is sufficient to cause the adhesive to flow.

3. A method according to claim 1 wherein the substrate comprises a pipe.

4. A method according to claim 1 wherein
   (a) the first surface of the polymeric element has an original depth measured from the first surface, and
   (b) after heat is applied, the embossed pattern has a depth that is at most 0.25 times the original depth.

* * * * *

UNITED STATES PATENT AND TRADEMARK OFFICE
CERTIFICATE OF CORRECTION

PATENT NO. : 5,660,660
DATED : Aug. 26, 1997
INVENTOR(S) : Greuel, Jr. et al.

It is certified that error appears in the above-identified patent and that said Letters Patent is hereby corrected as shown below:

Cover Page, Related U.S. Application Data [63], replace "Continuation-in-part of Ser. No. 156,518, Nov. 23, 1993, filed as PCT/US93/01592, Feb. 24, 1993, abandoned, which is a continuation of Ser. No. 841,391, Feb. 25, 1992, abandoned." by --U.S. national stage of PCT/US93/01592, February 24, 1993, which is a continuation-in-part of U.S. application No. 841,391, filed February 25, 1992, abandoned.--.

Column 1, line 9, replace "Gruel" by --Greuel--.

Column 4, line 53, replace "which" by --with--.

Column 4, line 63, replace "pattern" by --process--.

Column 5, line 10, replace "goad" by --good--.

Column 5, line 46, after "least" insert --part--.

Signed and Sealed this

Twenty-fourth Day of February, 1998

Attest:

BRUCE LEHMAN

*Attesting Officer*  *Commissioner of Patents and Trademarks*